United States Patent
Page et al.

(10) Patent No.: US 10,131,397 B2
(45) Date of Patent: Nov. 20, 2018

(54) VEHICLE STABILITY, STEERING, RIDE CHARACTERISTICS AND CONTROL

(71) Applicant: Alan Page, Hamilton Hill (AU)

(72) Inventors: Alan Page, Hamilton Hill (AU); Aldo Contarino, North Perth (AU)

(73) Assignee: Alan Page, Hamilton Hill (AU)

( * ) Notice: Subject to any disclaimer, the term of this patent is extended or adjusted under 35 U.S.C. 154(b) by 162 days.

(21) Appl. No.: 14/443,599

(22) PCT Filed: Nov. 19, 2013

(86) PCT No.: PCT/AU2013/001331
§ 371 (c)(1),
(2) Date: May 18, 2015

(87) PCT Pub. No.: WO2014/075152
PCT Pub. Date: May 22, 2014

(65) Prior Publication Data
US 2015/0329165 A1    Nov. 19, 2015

(30) Foreign Application Priority Data
Nov. 19, 2012   (AU) ................................ 2012905017

(51) Int. Cl.
*B62K 5/06*   (2006.01)
*B62K 5/10*   (2013.01)
(Continued)

(52) U.S. Cl.
CPC .................. *B62K 5/10* (2013.01); *B62K 5/02* (2013.01); *B62K 5/027* (2013.01); *B62K 5/06* (2013.01);
(Continued)

(58) Field of Classification Search
CPC . B62K 5/10; B62K 5/06; B62K 25/06; B62K 25/08; B62K 25/10; B62K 21/20; B62K 5/027; B62K 5/02
See application file for complete search history.

(56) References Cited

U.S. PATENT DOCUMENTS 1,092,910 A * 4/1914 Harley ...................... B62J 1/14
                                                    180/210
3,605,929 A    9/1971 Rolland
(Continued)

FOREIGN PATENT DOCUMENTS

DE   102008004074 A1   7/2009
WO      01/87689 A1   11/2001

OTHER PUBLICATIONS

The International Search Report received in connection with International Application No. PCT/AU2013/001331 filed Nov. 19, 2013.
(Continued)

*Primary Examiner* — Tony H Winner
(74) *Attorney, Agent, or Firm* — Dorsey & Whitney LLP

(57) ABSTRACT

A vehicle O, such as a tricycle, has a pair of rear wheels 14 mounted to a first sub-frame 12, and a second sub-frame 16 pivotally coupled to the first sub-frame and arranged to pivot about a first pivot axis 18 relative to said first sub-frame. Relative rotation between the first and second sub-frames is provided, such as by one or more elastomeric couplings or bearings e.g. torsional pivot 98. At least one front wheel 22 is coupled to the second sub-frame via forks and a steering head. A seat 20 for a rider is supported by the second sub-frame. Handlebars 28 are coupled to the steering head via at least one steering member, such as a mechanical link 60 or hydraulic, magnetic or electrical link The cycle is steered by acombination of handlebar and/or lean steer. Steering can be damped by a damper 79. Handlebar steer involves manipulating the handlebars to act on the steering (Continued)

arm which rotates the steering head and therefore also the front wheel(s) to steer the front wheel(s). Lean steer articulates the second sub-frame relative to the first sub-frame and causes the front wheel(s) to steer via movement of the steering head coupled to the second sub-frame. Steering can transition or be trimmed (feathered) between these two modes dependent on speed and terrain.

22 Claims, 10 Drawing Sheets

(51) Int. Cl.
    *B62K 5/027*     (2013.01)
    *B62K 21/20*     (2006.01)
    *B62K 5/02*     (2013.01)
    *B62K 25/08*     (2006.01)
    *B62K 25/06*     (2006.01)
    *B62K 25/10*     (2006.01)
    *B62K 5/00*     (2013.01)

(52) U.S. Cl.
    CPC .............. *B62K 21/20* (2013.01); *B62K 25/06* (2013.01); *B62K 25/08* (2013.01); *B62K 25/10* (2013.01); *B62K 2005/001* (2013.01)

(56) References Cited

U.S. PATENT DOCUMENTS

| | | | | |
|---|---|---|---|---|
| 4,088,199 A * | 5/1978 | Trautwein | ............ | B60G 21/007 180/209 |
| 4,497,502 A * | 2/1985 | Forbes | ............ | B62D 9/02 280/240 |
| 4,572,535 A * | 2/1986 | Stewart | ............ | B62K 3/005 280/266 |
| 4,789,173 A * | 12/1988 | Lofgren | ............ | B62K 3/005 280/282 |
| 5,040,812 A * | 8/1991 | Patin | ............ | B60G 21/007 280/124.103 |
| 5,209,506 A * | 5/1993 | Klopfenstein | ............ | B62K 5/08 280/240 |
| 5,431,243 A * | 7/1995 | Richards | ............ | B60G 3/01 180/211 |
| 5,568,935 A * | 10/1996 | Mason | ............ | B62K 3/005 280/266 |
| 5,607,171 A | 3/1997 | Labranche | | |
| 5,727,801 A * | 3/1998 | Barney | ............ | B62K 5/02 280/231 |
| 5,730,453 A * | 3/1998 | Owsen | ............ | B62K 5/10 280/124.103 |
| 5,762,351 A * | 6/1998 | SooHoo | ............ | B60G 21/007 180/210 |
| 5,941,548 A * | 8/1999 | Owsen | ............ | B62K 5/10 280/266 |
| 6,062,581 A * | 5/2000 | Stites | ............ | B62K 3/005 280/226.1 |
| 7,487,985 B1 * | 2/2009 | Mighell | ............ | B62K 5/027 180/210 |
| 7,543,829 B1 * | 6/2009 | Barnes | ............ | B62K 5/02 180/210 |
| 7,552,790 B2 * | 6/2009 | Dower | ............ | B62D 9/02 180/210 |
| 7,661,690 B2 * | 2/2010 | McClure | ............ | B62K 5/02 280/259 |
| 7,708,291 B1 * | 5/2010 | Henderson | ............ | B62D 9/02 280/124.103 |
| 8,070,172 B1 * | 12/2011 | Smith | ............ | B60G 11/08 280/124.103 |
| 8,141,890 B2 * | 3/2012 | Hughes | ............ | B60G 21/007 180/210 |
| 8,292,315 B1 * | 10/2012 | Pelkonen | ............ | B62K 5/06 280/266 |
| 9,061,724 B2 * | 6/2015 | James | ............ | B62M 1/36 |
| 9,114,844 B2 * | 8/2015 | Walter | ............ | B62K 13/04 |
| 2004/0140645 A1 * | 7/2004 | Hayashi | ............ | B62K 5/05 280/282 |
| 2004/0232644 A1 * | 11/2004 | Contarino | ............ | B60G 5/00 280/124.109 |
| 2006/0022422 A1 * | 2/2006 | Tasma | ............ | B62K 5/027 280/124.135 |
| 2006/0207845 A1 * | 9/2006 | Gogo | ............ | B62K 21/08 188/290 |
| 2007/0001422 A1 * | 1/2007 | Kraus | ............ | A63B 22/00 280/200 |
| 2007/0152422 A1 * | 7/2007 | Lin | ............ | B62K 5/02 280/275 |
| 2010/0194068 A1 * | 8/2010 | Henderson | ............ | B62D 9/02 280/124.103 |
| 2012/0175856 A1 * | 7/2012 | Ellis | ............ | B60N 2/005 280/124.103 |

OTHER PUBLICATIONS

The International Preliminary Report on Patentability and Written Opinion received in connection with International Application No. PCT/AU2013/001331 filed Nov. 19, 2013.
Extended European Search Report dated Jul. 6, 2016 for European Patent Application 13854509.0, 8 pages.

* cited by examiner

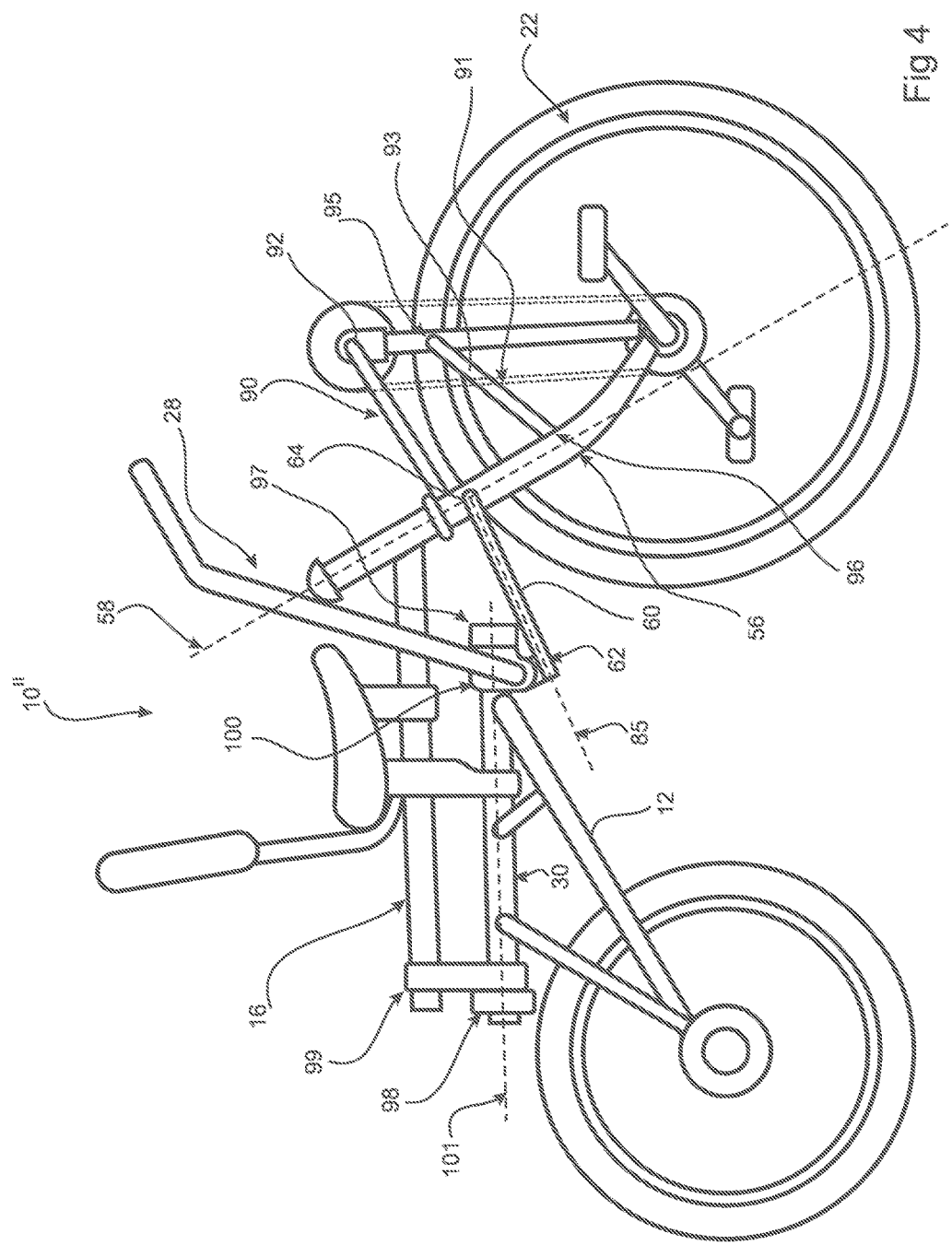

VEHICLE STABILITY, STEERING, RIDE CHARACTERISTICS AND CONTROL

CROSS-REFERENCE TO RELATED APPLICATIONS

This application claims priority under 35 U.S.C. § 371 as a national phase application of PCT/AU2013/001331, filed 19 Nov. 2013, with priority to AU 2012905017, filed 19 Nov. 2012, each of which is incorporated by reference herein, in the entirety and for all purposes.

FIELD OF THE INVENTION

The present invention relates to vehicle stability, steering, ride characteristics and control.

Particularly, the present invention relates to apparatus for and control of vehicle steering and control of ride characteristics including steering characteristics.

BACKGROUND TO THE INVENTION

Almost exclusively, wheeled land vehicles (typically, forklifts, some small front bucket dumpers used in construction, and other specialized steering devices excepted) employs direct front wheel steering as a directional steering means. The greater the wheelbase, the greater tendency of the rear wheel(s) to 'straight line' the front wheels and clip corners.

Innovations in the automotive industry have mitigated this shortcoming with the introduction of front and rear wheel steering, with the vehicle chassis remaining a rigid structure.

Human (pedal) powered cycles (particularly bicycles and tricycles) have been used as a mode of transport for over a century throughout the world. Most bicycles and tricycles are characterized by a frame which is coupled to two or three wheels, a seat, handlebars and a crank.

Typically the frame includes a fork to which a front wheel is rotatably coupled at one end and handlebars attached at the opposite end. The cranks may be either directly coupled to the front wheel or alternatively coupled via a chain to a rear wheel. The seat is supported on the frame so that a rider is ergonomically placed to deliver maximum power in a comfortable position, relative to the components and weight distribution.

Several decades ago, recumbent cycles became available to the general public. Most, but not all recumbent cycles comprise three wheels and are characterized by a relative juxtaposition of seat, cranks and handlebars such that the rider is in a reclined or recumbent position when riding the cycle.

Recumbent cycles are sometimes shunned for different reasons including perceptions that they were simply a fancy type of tricycle and lack the handling characteristics of a bicycle.

One such cycle is discussed in U.S. Pat. No. 6,062,581 which discloses a front wheel pedal bicycle with handlebars arranged under the seat on a vertical pivot axis. The handlebars swing forwards and backwards at each end thereof in order to steer the front wheel via twin cables connected between the handlebar and the steering column. The front to back swinging handlebars due to the vertical pivot axis conflicts with the rider's legs pedalling the front wheel. The handlebars do not articulate with the front sub-frame, thereby causing an uncomfortable rider experience due to only the front wheel frame lean steering.

U.S. Pat. No. 4,789,173 discloses a three wheel recumbent cycle with a front frame pivoted to a rear frame supported on two rear wheels. The seat is attached to the upper frame which pivots to lean steer the tricycle. Handlebars are positioned under the seat but are rigidly fixed under the seat to the frame supported by the rear wheels. Only lean steer is used to steer the vehicle. There is no handlebar steering.

U.S. Pat. No. 5,240,267 discloses a lean steer cycle having a pair of rear wheels which remain in normal upright contact with the road surface whilst the front single wheel is steered by lean steering the entire front frame with seat and handlebars in one unit.

Other arrangements exist, such as in U.S. Pat. No. 5,568,935 which discloses a tricycle type recumbent cycle a pair of rear wheels is supported on a rear axle, with propulsion by pedals to the front wheel. The front frame and seat tilt by lean steering which causes the front wheel to turn. No handle steering is provided.

Another arrangement is disclosed in U.S. Pat. No. 4,572,535 that teaches an alternative arrangement of recumbent tricycle with lean steering and fixed handlebars.

Direct drive cycles (where a rider pedals an axle of a wheel that is also being steered) suffer from pedal force/torque feedback. A rider's pedalling generates alternating steering torque which when fed back to the handlebars needs to be resisted by the rider. In resisting this feedback the rider can induce a wobble through the handlebars. A reduction in this feedback would provide a cycle design that is more comfortable for the rider by reducing the rider's tendency to induce wobble through the handlebars and thereby assist in keeping the cycle on a straight line.

In the claims which follow and in the preceding description of the invention, except where the context requires otherwise due to express language or necessary implication, the word 'comprise' or variations such as 'comprises' or 'comprising' is used-in an inclusive sense; i.e. to specify the presence of the stated features but not to preclude the presence or addition of further features in various embodiments of the invention.

With the aforementioned in view, it is an object of the present invention to provide alternative form of a cycle steering which attempts to redress one or more of the above mentioned problems.

It is desired to provide improved cycle steering for improved high and low speed manoeuvrability of the cycle.

It would further be desirable to provide an upright easily visible seating position, a construction of reduced complexity compared to other tilting cycles, suppression of pedal feedback to the handlebars and a lightweight design for a tilting cycle.

SUMMARY OF THE INVENTION

The present invention desirably provides improved steering characteristics through an angular articulation of a main frame/chassis at a convenient position between the front and rear wheels describing a similar arc to the front wheel(s) providing smoother, safer, predictable cornering—A configuration realised to be suited to, for example but not exclusively, recumbent cycles, land yachts, swamp skis, recreational watercraft etc; propeller, wind, motor or human propelled; on wheels, floats, skis etc.

By way of illustrating the principle, the pedal cycle depicted is the subject, embodying human propulsion though front wheel drive. However, it will be appreciated that the vehicle may be powered by other than human (pedal) power.

The steering geometry and frame design can be utilised regardless of the actual form of propulsive power applied. For example, an internal combustion engine or electric motor may be employed. An electric motor may be powered by batteries and/or solar power. Fuel cell technology is also considered an option for propulsion.

The electric or other onboard power supply may drive one or both of the rear wheels. For example, by a belt, chain or shaft drive, or direct drive by pressure of a drive wheel to the vehicle wheel(s) or tyre(s).

According to an aspect of the present invention there is provided a vehicle having:
a first sub-frame and a pair of rear wheels coupled to said first sub-frame;
a second sub-frame pivotally coupled to said first sub-frame whereby said second sub-frame is arranged to pivot about a first pivot axis relative to said first sub-frame; and
a seat supported by said second sub-frame, the seat arranged to seat a rider of said vehicle; and
at least one steerable front wheel coupled to said second sub-frame via the pivotable steering head; and
handlebars operatively coupled to said steering head via at least one steering member,
whereby said vehicle is steered by at least manipulating said handlebars to act on said steering arm which rotates the steering head and therefore also the front wheel to steer the front wheel.

Preferably, steering may be effected by a combination of forces applied by pivoting of said second sub-frame relative to said first sub-frame and said manipulation of said handlebars.

Preferably, the handlebars are connected to the steering head via at least one damper. The damper arranged to damp steering motion to prevent or at least restrict sudden steering motion or over steering under unfavourable conditions.

The at least one damper may be connected between the second sub-frame and the steering head or front forks.

Preferably the at least one damper therefore has flexible or compliant couplings to the second sub-frame and/or steering head/front forks to accommodate relative movement thereof. Alternatively, or in addition, the damper may be integrated into or between the second sub-frame and/or steering head/front forks.

Preferably, a rider moving their centre of gravity off centre relative to a central axis of the first sub-frame and/or second sub-frame causes the second sub-frame and therefore also the seat to rotate relative to the first sub-frame. Thereby causing the second sub-frame and steering head to rotate relative to one another.

Through the steering geometry of the vehicle, the pivot axis of the steering head may be angled relative to the pivot axis of the second sub-frame, which aids in ensuring a rider lean and front wheel steer action to steer the vehicle.

The steering head pivot axis may be set at between 45 degrees and 180 degrees relative to the second sub-frame.

Advantageously, because of the steering geometry, the rider's centre of gravity remains within a triangle footprint of the two rear wheels and front wheel when steering. This maintains vehicle and rider stability when cornering, and provides a safer vehicle and ride characteristics for the rider.

Preferably, the first sub-frame and second sub-frame are pivotably coupled to one another via at least one bush allowing restricted relative rotation between the first and second sub-frames.

Preferably, the at least one bush includes one or more elastomeric bush members, such as rubber or synthetic polymer bushes.

Preferably, the at least one steering member couples to the steering head via a pair of front forks supporting the front wheel.

It will be appreciated that connecting the at least one steering member to an upper part of the front forks (a lower part of the front forks connecting to the front wheel) allows the steering member to apply a turning force to the front forks to turn the steering head and front forks (and therefore the front wheel) relative to the second sub-frame.

The at least one steering member may be coupled to the steering head or front forks froward of the steering head pivot axis.

Reference to 'forward of' or 'in front of' or 'ahead of' in this specification refers to the leading direction of travel of the vehicle going forwards.

According to a further aspect of the present invention there is provided a vehicle including:
a first sub-frame connected to at least one wheel of the vehicle;
a second sub-frame and a seat for supporting a rider of the vehicle, the second sub-frame arranged to pivot about a pivot axis relative to said first sub-frame; and
at least one further wheel rotatably coupled via a generally horizontal axis and separately pivotably coupled to said second sub-frame via a generally upright pivot axis; and
handlebars pivotally coupled relative to said first sub-frame for movement about a pivot axis and connected to said at least one further wheel by a mechanical steering link;
whereby said vehicle is lean steered by applying a force to pivot said second sub-frame relative to said first sub-frame to effect lean steering of said at least one further wheel and/or is mechanically steered by upward movement of a first end portion of said handlebars relative to said pivot axis to effect a mechanical steering of said at least one further wheel via said mechanical steering link.

The handlebar pivot axis may be substantially horizontal or substantially vertical, or an angle in between horizontal and vertical. A substantially horizontal pivot axis allows the handlebars to move up and down rather than front to back, thereby avoiding the need for the rider to reach forward with part of the handlebars moving forward away from the rider.

The vehicle may preferably be a cycle, such as a tricycle or bicycle. However, whilst tricycle and bicycle respectively suggest three and two wheeled cycles, the vehicle may include other numbers of wheels, such as a four wheeled cycle.

The vehicle may be configured to preferentially steer primarily by lean steering at high speeds and primarily by handlebar steering at low speeds.

Transition between the lean steer and handlebar steering modes may be engineered into the vehicle by specification of frame design/geometry, pivot resistance, handlebar and mechanical link design, and steering geometry.

The proportion of lean steer or handlebar steer that predominates over the other of those steering modes varies with speed of the vehicle. Transition from handlebar steer predominating to lean steer predominating occurs with increase in speed. For example, at low speeds (such as walking pace—e.g. up to about 5 km/hr) handlebar steering is the predominant steering mode. As speed increases, the dominant mode of steering gradually transitions from handlebar steering to lean steering, and lean steering predominates at higher speeds, for example above about 10 km/hr. Rate of transition can be controlled by the resilience in and/or resistance to frame articulation and/or front fork turn.

Steering control can trim or 'feather' between one of the steering modes and the other, which is particularly useful at intermediate speeds.

Low speeds can be understood to be from a standstill to low single figure km/h speeds. Intermediate speeds are understood to be from single figure km/h speeds to km/h speeds in the low to mid 'teens. High speeds are from the intermediate speed upwards. The predominant proportion of steering control can be transitioned between handlebar steer and lean steer dependent upon speed, with trimming (or feathering) or balancing between he two modes, leading to a blending of the two modes where both are used in proportions varying with speed.

In any embodiment of the present invention, propulsion may be by pedal crank coupled to one or more of the wheels (preferably said front wheel) for imparting torque to said one or more wheels, or propulsion may be by electric motor (such as a battery powered or solar powered motor) or internal combustion. Propulsion may be primarily by pedal power with auxiliary power for periodic or continuous back up propulsion from an electric motor or engine.

The handlebars may be coupled to the first sub-frame, for example, via a second pivot, such as a torsion pivot. Thus, the handlebars may pivot about an axis on the first sub-frame whilst directly or indirectly coupled to the second sub-frame.

The pivot for the handlebars may be below the seat, and preferably lower than the pivot between the first and second sub-frames.

The handlebars may be directly or indirectly coupled to said second sub-frame by a mechanical link.

The handlebars may also be directly or indirectly coupled to said first sub-frame by a pivot coupling such as a torsional pivot such that the handlebars rotate around the pivot axis with respect to the first sub-frame. Coupling of the handlebars to the second sub-frame may be at or adjacent to a steering head or column, such as connected to front forks for steering the front wheel(s). Thus, substantially vertical movement of the handlebars is transferred via the mechanical link to the steering column or head which in turn causes the front forks to turn or steer the front wheel(s) causes the front forks to steer the respective wheel(s). Rear wheel steering could be achieved by suitable corresponding connection to the rear wheels.

Alternative to or in addition to the mechanical link, at least one magnetic, hydraulic and or electric link may be employed to assist or effect steering. For example, steering may be power assisted or augmented to help the rider, which can be particularly useful if the rider has limited limb strength. Alternatively, the powered link may be employed to add damping or resistance to the steering, to help with steering control and/or resistance training.

The relative distance between a connection point of the steering link to the axis of the steering column compared to the distance between the point of connection between the steering link to the handlebar pivot axis can be used to determine the mechanical steering effect, as can the distance of the handlebar pivot below the connection point of the steering link to the steering column.

A steering damper may be provided. This may include first and second coupling a damper device to the first and second sub-frames at respective positions on opposite elevations of said pivot axis. The damper device may be extendible in length and may include a fluid controlled or driven cylinder and rod arrangement attached at one end to said cylinder, an opposite end of said rod constituting one of said first or second ends of said damper device. Preferably said damper includes an actuator coupled with said second sub-fame for varying fluid pressure within said cylinder in response to motion of said second sub-frame relative to said first sub-frame.

A further aspect of the present invention provides a lean or tilt mechanism for a cycle, including at least one friction bearing or pivot allowing a degree of tilt of a first sub frame of the cycle about a pivot axis relative to a second sub frame of the cycle.

Preferably the mechanism includes a clutch to limit or control the degree of lean/tilt and/or rate of lean/tilt and/or a lean stop.

At least one form of the present invention relates to vehicle steering through vehicle frame angular articulation as well as mechanical steering.

It will be appreciated that the steering set-up according to forms of the present invention maintains the rider's centre of gravity within the three wheel footprint of the tricycle. This aids stability when cornering, especially at speed. At speed, the rider can lean sideways into a bend to assist steering via the rotation of the seat and second sub-frame relative to the first sub-frame and rear wheels. This affects steering of the front wheel via the front forks and steering head coupled to the second sub-frame. This lean steer action helps to transfer rider centre of gravity towards the side of the vehicle that would be trying to lift in the corner. For example, in a right hand bend, the rider lens or shifts weight to the right. This puts more weight onto the right hand rear wheel helping it to remain in contact with the ground rather than lifting in the corner. A left hand lean or weight shift helps cornering stability for left hand corners. At lower speeds, the handlebar steering acting via the steering member to the steering head and front forks helps effect steering.

It will further be appreciated that the rider can transition and balance steering from one form to the other, dependent upon ability, terrain and speed conditions. For example, a rider may use the handlebar steering by pushing down on one side of the handlebars to influence steering in a preferred direction with less or more lean or weight shift. Thus, the present invention provides options and flexibility for steering that other systems do not provide. This flexibility is particularly useful for professional/serious, disabled and elderly riders wishing or needing to have a range of control.

BRIEF DESCRIPTION OF THE DRAWINGS

At least one embodiment of the present invention will hereinafter be described by way of example with reference to the accompanying drawings, in which:

FIG. 4 is a schematic representation of a cycle according to a third embodiment of the present invention.

FIG. 7a shows a rear view of a standard bicycle leaning at speed through a bend with both front and rear wheels leaning. FIG. 7b shows an embodiment of a tricycle according to the present invention with lean steer and reaction forces, and noting the rear wheels remain stable whilst the front wheel and rider leans.

DESCRIPTION OF PREFERRED EMBODIMENT

Figure 1:
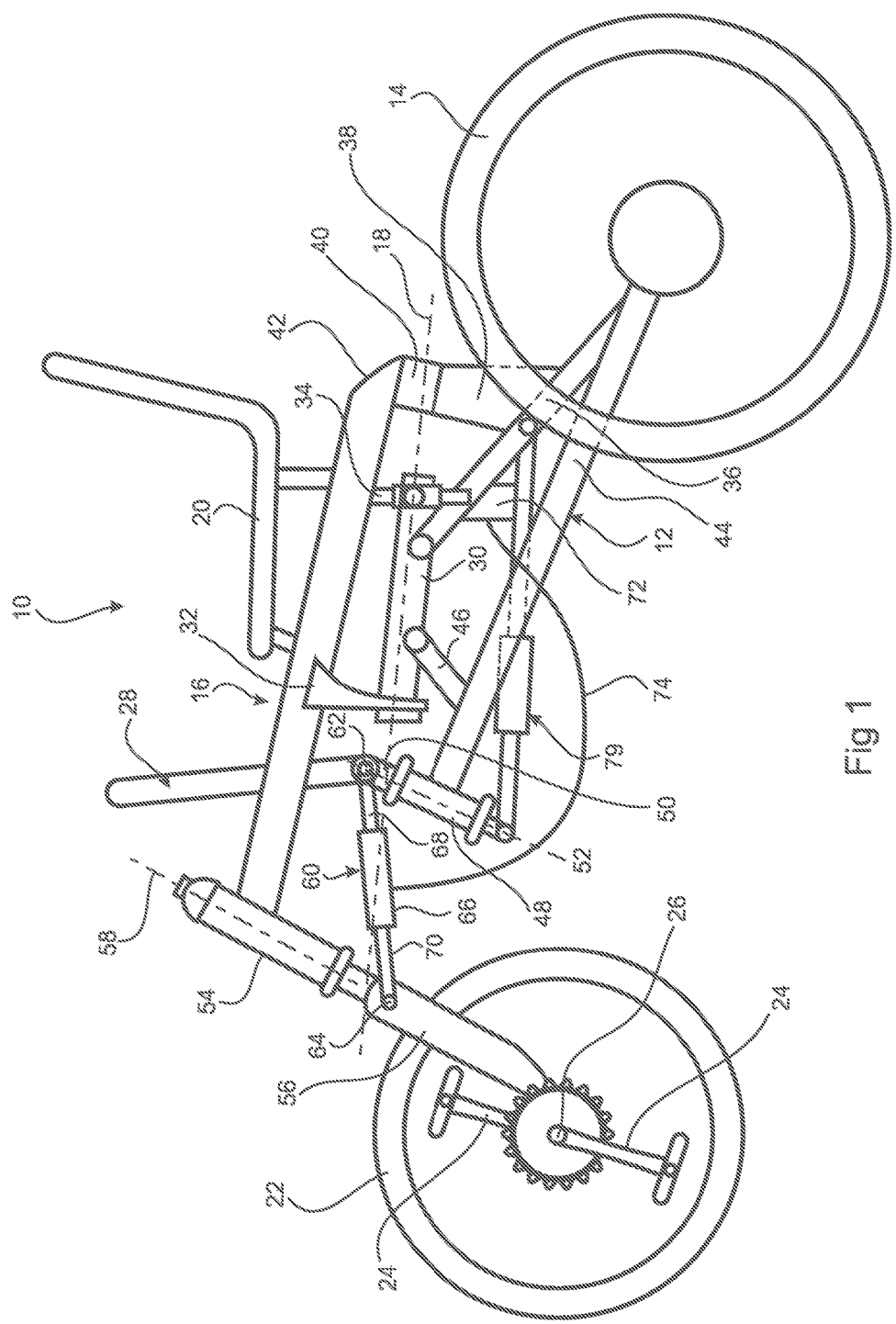
FIG. 1 is a schematic representation a cycle according to an embodiment of the present invention.

Referring to FIG. 1, an embodiment of the cycle 10 includes a sub-frame 12 to which a pair of rear wheels 14 (only one shown in this view) is coupled. A second sub-frame 16 is pivotally coupled to the first sub-frame about a pivot axis 18 whereby the second sub-frame 16 can pivot about the axis 18 relative to the first sub-frame. A steerable front wheel 22 is coupled to the front end of the second sub-frame. A pedal crank 24 is attached to and drives the front wheel 22 about an axle 26. Handlebars 28 are coupled to the first sub-frame 16 for steering the front wheel. Second sub-frame 16 is pivoted relative to the first sub-frame by a rider, in the seat 20, leaning and/or applying bodyweight on either side of the axis 18. Accordingly, the cycle 10 is steered by manipulation of the handlebars to pivot the second sub-frame, applying a shift in weight to pivot the second sub-frame and/or a combination of manipulation of the handlebars and a shift in weight to pivot the second sub-frame (pivoting of the second sub-frame being relative to the first sub-frame).

The first sub-frame 12 includes a plurality of connected tubular members. One tubular member 30 extends in a substantially horizontal plane and is coaxial with the axis 18. A shaft (not shown) is disposed within the tubular member 30 and is able to rotate about axis 18. The second sub-frame 16 is coupled to the shaft via member 32 and members 34. A pair of tubular members 36 of the first sub-frame 12 extend diagonally, one each side, from the tubular member 30 to a hub (not shown) of the rear wheels. Extending substantially upright from the members 36 is a bracket 38 on which is mounted a rubber block 40 (or the like). A rear end 42 of the second sub-frame is coupled to the first sub-frame via an elastomeric material, such as a synthetic, natural, or composite synthetic-natural polymer. For example, a rubber member may be utilised e.g. a rubber block.

A further member 44 of the first sub-frame is coupled at one end to the member 36 and the hub of the rear wheel and extends diagonally upwards to a location in advance of the member 30. The member 44 is further coupled to the member 30 by an intermediate spar 46. A transversely extending sleeve 50 is retained within the sleeve 48 and is able to rotate about a longitudinal axis 52 of the sleeve 48.

A front end of the second sub-frame 16 is provided with a substantially conventional head stem 54 and forks 56. The forks are able to rotate about a longitudinal axis 58 of the head stem 54.

The sub-frame connected to the steering head/forks can be angled in the sense that the sub-frame member(s) (i.e. of the second dub-frame) connecting to the steering head or forks deviates upwards from a straight line axis partially along its length. That is, there is a bend or deflection upwards along the length of the sub-frame. Such a variation in frame/steering geometry can improve steering stability and alter steering and handling characteristics. The degree of bend or deflection can be tailored to a particular application, need or person.

The handlebars 28 are directly coupled to the second sub-frame via a mechanical link 60. The mechanical link has a first end 62 pivotally coupled to the handlebars at a location above the pivot axis, and a second opposite end which is pivotally coupled to the forks at a location below the axis 18. Moreover, rather than simple pivot connections, ideally the ends 62 and 64 are provided with a universal type connection or ball like connection allowing pivotal motion in more than one axis. Mechanical link 60, in this embodiment (see FIG. 1), includes a fluid driven (slave) cylinder 66 coupled to and between rods 68 and 70. The rod 68 includes the end 62 while the rod 70 includes the end 64. By this arrangement the length between the ends 62 and 64 can vary as the rods 68 and or 70 extend or retract into the slave cylinder 66. This is an alternative embodiment to reduce pedal torque/force feedback, such as through varying the length of the mechanical link 60. The mechanical link 60 could be entirely hydraulic with a hydraulic cable linking a master cylinder on the handlebars or elsewhere and a slave cylinder connected to the front forks.

The cylinder 66 may take the form of a pneumatic or hydraulic cylinder although a hydraulic cylinder is preferred. Hydraulic pressure in the cylinder 66 is reacted by a master cylinder 72 which is in fluid communication with the cylinder 66 via a hose 74. The cylinder 72 is coupled to the second sub-frame 16, and responsive to the degree of tilt of the second sub-frame 16 relative to the first sub-frame 12. As the-degree of tilt between the two sub-frames increases, greater pressure is applied to the fluid in cylinder 72 which is transmitted via the hose 74 to the cylinder 66. This applies a bias to the coupling between the handlebars 28 and the forks 56 to provide added stability to the steering of the cycle 10.

The cylinder 72 is on a side of the axis 18 opposite that containing the mechanical link 60. When the cycle 10 is being ridden, pushing on the pedal crank 24 may tend to rotate the forks 56 about the axis 58. For example, when applying pressure to the pedal crank 24 with a right foot the front wheel 22 would tend to deflect or turn to the left. However, at the same time the right buttock drops causing the second sub-frame 16 to tend to tilt to the right. This increases the hydraulic pressure within the cylinder 72 which is transferred via the hose 74 to the cylinder 66 having the effect of extending the length of the link 60 which will make it turn more to the right to cancel the deflection to the left created by pushing on the pedals, thus helping to reduce pedal torque feedback.

The crank 24 can be directly coupled with the axle 26 to provide a fixed gear cycle. However, in an alternative embodiment a variable ratio hub may be provided in the front wheel 22 which is driven by the crank 24 with a gear selector button or lever (not shown) attached to the handlebars 28 to enable a rider to select a desired gear. Alternatively, as shown in the second embodiment in FIGS. 2 and 3, a standard derailleur system maybe used to provide variable ratio gearing.

A damper 79 is also coupled between the handlebars 28 and a crossbar (shown-in FIG. 3 as item 80) of the first sub-frame 12 to assist in reducing manual force required to turn the handlebars 28 and lighten the steering.

Figure 2:
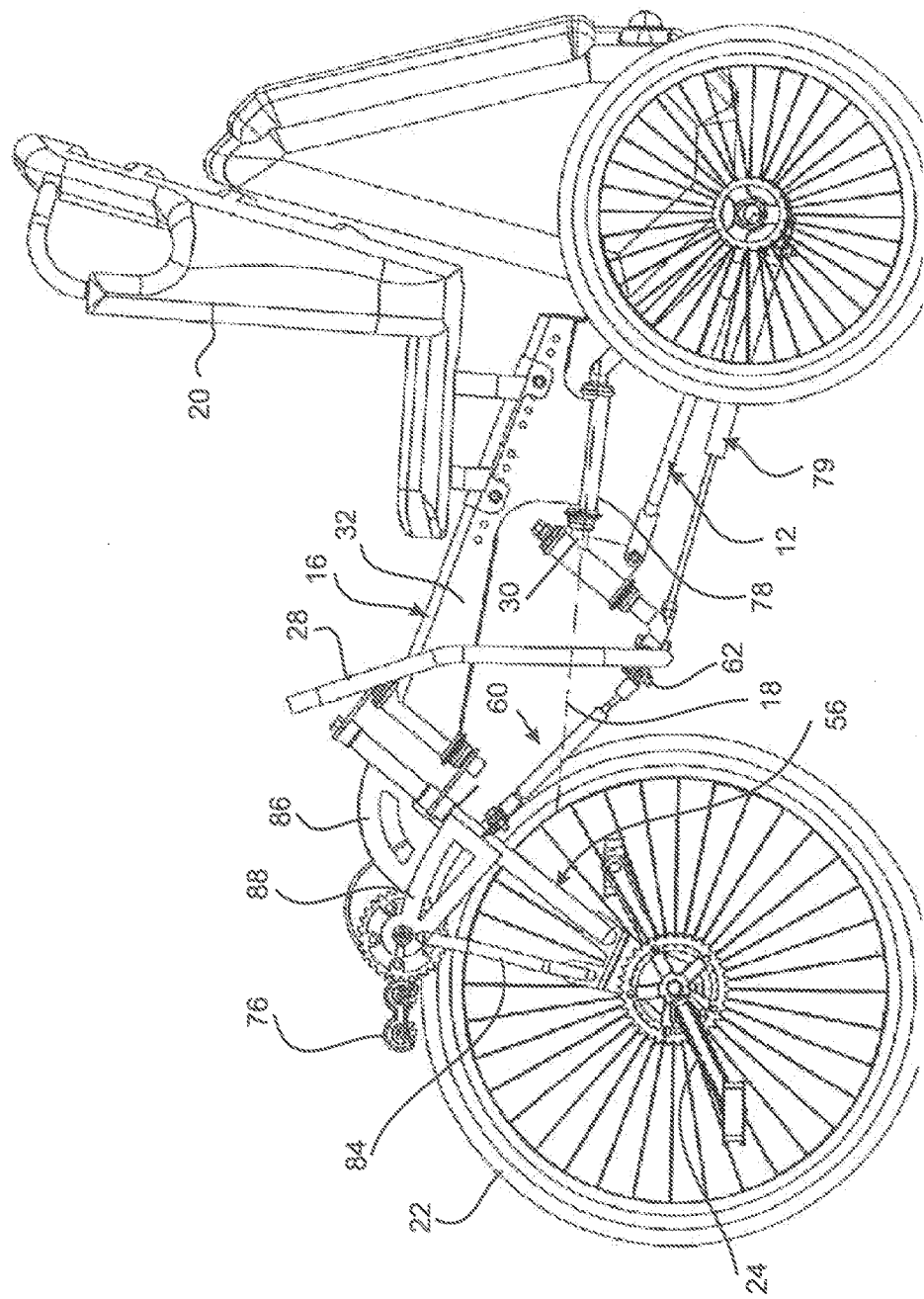
FIG. 2 is a schematic representation of one side of a cycle according to a second embodiment of the present invention.
Figure 3:
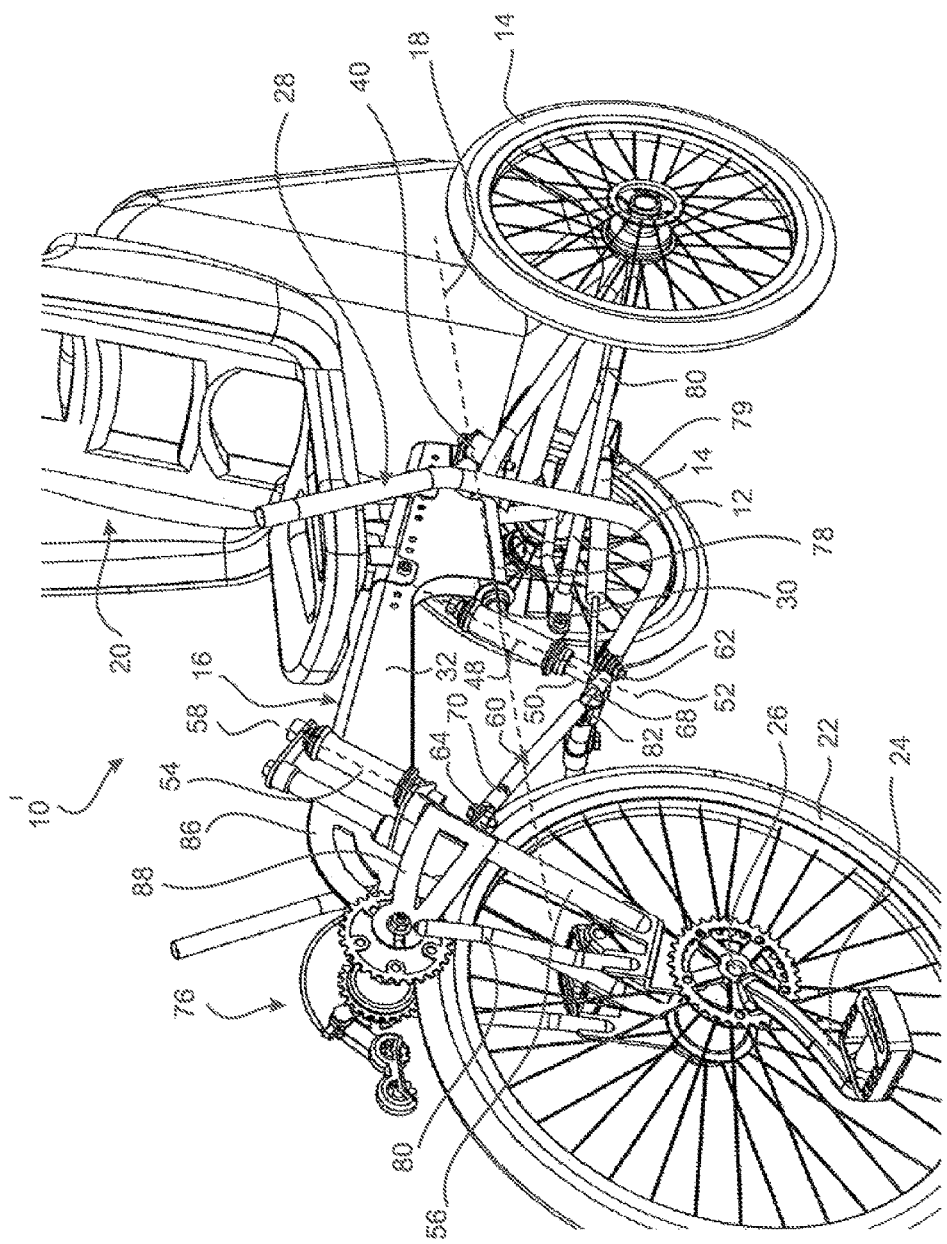
FIG. 3 is a perspective view of the cycle depicted in FIG. 2.

FIGS. 2 and 3 depict an alternate embodiment of the cycle 10' in which like reference numbers are used to denote like features. The main differences between; the cycle 10 and cycle 10' lie in the configuration and structure of the sub-frames 12 and 16, the use of a simplified mechanical link 60, and the addition of a derailleur gear system and associated double chain transmission 76. In the cycle 10', the member 30 of the first sub-frame 12 forms an inner support shaft for an-outer sleeve 78 which can pivot about be axis 18 and is coupled to the second sub-frame 16 via web 32. Also, the stem 50 of the handlebars 28 now extends from the bottom end of the sleeve 48 rather than the top end as in the cycle 10'. The mechanical link 60 remains pivotally coupled at opposite ends 62 and 64 to the handlebars 28 and forks 56 respectively. Again, the pivot points 62 and 64 are on opposite sides of the axis 18 configuration in comparison with the cycle 10' (FIG. 1) with the end 64 now above the pivot axis 18 and the end 62 below the pivot axis 18. The link 60 can include a simple hydraulic, spring or gas damper or strut.

The fork arrangement 56 in the cycle 10' is also of greater complexity than that of the cycle 10 by the addition of members 84 and flanges 86 and 88 for supporting the derailleur gear system and chain tensioner 76.

The general operation and function of the cycle 10' is the same as the cycle 10 with the front wheel 22 being directly driven by the pedal crank 24 and steering being provided to the front wheel 22 by the combined action of the handlebars 28 and lean steer provided by pivoting of the second sub-frame 16 about axis 18 relative to the first sub-frame 12.

FIG. 4 depicts an alternate embodiment of the cycles 10 and 10' in which like reference numbers are used to denote like features. Main differences between the cycle 10" and the cycles 10 and 10' include the configuration and structure of the sub-frames 12 and 16 and the use of a simplified mechanical link 60 coupled to the handlebars 28 and front forks 56 such that the line 85 through the two coupling points 62 and 64 is more or less perpendicular to the line of pivot 58 of the front forks as seen in the illustrated elevation view FIG. 4. Other main differences are in the front forks as below:

Two frame members 90 extending from a point 93 on the steering forks 56 to, a point 92, on either side of the gear hub which replaces the derailleur gears 76 as seen in FIG. 3.

Two frame members 91 extending from two points 96 on either side (one point not shown in the elevation view) of the forks to two points 95 (one point not shown) on either side of the wheel 22.

With reference to the configuration and structure of sub-frame 12 in FIG. 4 a major difference is the coupling of two torsional pivots 98 and 97 to either end of sub-frame member 36 is a substantially concentric pivot line 101. Pivot 98 is coupled to both frame member 30 and sub-frame 16 via a bracket 99 through a resilient material, such as an elastomer block, contained within the pivot 98. Pivot 97 is coupled to both the frame member 30 and the handlebars 28 via a handlebar clamp 100. Handlebar clamp 100 is free to rotate about axis 101. Pivot 97 contains a resilient material, such as an elastomer block, similar to pivot 98. This is to provide some torsional resistance to the vertically moving handlebars thus allowing a leaning rider to push or pull on the handlebars when necessary for steering as well as reducing pedal torque feedback to the handlebars.

Now that elements of the present invention have been described in detail, it will be apparent to those skilled in the relevant art that numerous modifications and variations may be made without departing from the basic inventive concepts. For example, the specific structure and configuration of the and second sub-frames 12 and 16 may vary considerably. An important aspect of the present invention is not the precise physical structure of the sub-frames but rather their pivotal relationship with the second sub-frame being coupled to the front wheel to provide lean steer and the handlebars coupled to the second sub-frame so that the handlebars rotate in a substantially vertical plane whereby to effect steering a rider would either push down or pull up (or both) on opposite ends of the handlebars. It should also be noted that forming the mechanical link with the master/slave cylinder arrangement is not a critical feature of the present invention. Indeed, the mechanical link between the handlebars and second sub-frame can be via a rod of fixed length or even coupled hydraulically. Thus, the mechanical link need not be rigid link but may take the form of a hydraulic or pneumatic coupling providing the same function as a rigid link.

Aspects of the present invention are revealed through four functional features applicable to a cycle:
1. Steering Geometry, 2. Frame Geometry, 3. Torsional Steering and Lean Mechanisms, and 4. Handlebar Geometry.

1. Steering Geometry

Figure 5A:
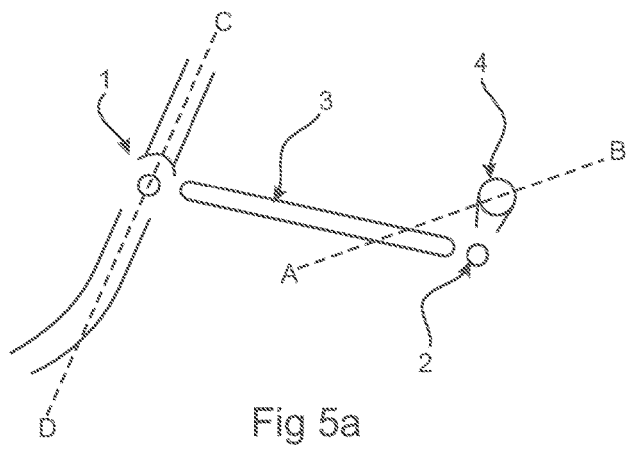
FIGS. 5a and 5b reveal diagrammatic side and plan views of features of steering geometry of an embodiment of the present invention.
Figure 5B:
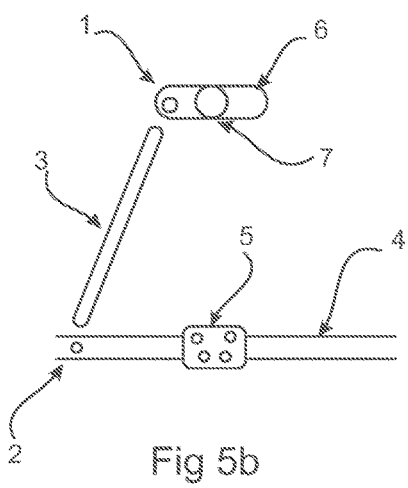

Referring to FIGS. 5a and 5b, the pivot line C-D of the front forks is at a different angle from that of the handlebars A-B. To assist understanding, FIG. 5a is a side elevation and FIG. 5b is a plan view of an embodiment of the steering geometry.

Point 2, where the steering rod trailing end couples to the handlebars is lower than point 1 the leading end of the steering rod coupling to the front forks. This allows the rider to directly lean on the handlebars to cause the handlebars to pivot through the torsional pivot in the handlebars and thereby impart steering movement to the front forks via movement in the handlebars coupling to the front forks through the steering rod. This geometry provides distinct advantages, such as having the handlebars move up and down (e.g. substantially vertically) as they rotate rather than swing forwards and backwards into/away from the body of a rider while turning.

The torsional pivot in the handlebars allows movement of the handlebars at the same time providing resistance to the rider falling over when steering and leaning at slow speed. The torsional pivot can limit the amount of lean by including a physical maximum limit of lean i.e. a physical stop, or having increasing torsional resistance that overleaning cannot be achieved, such as through heavy damping.

Heavy damping in the torsional pivot for the handlebars permits greater sensitivity in the steering i.e. small rotational movement in the handlebars permits proportionally greater rotational movement in the front forks by reason of the distance between points 2 (steering rod trailing end coupling to the handlebars) and point 5 (handlebar torsional pivot point on sub-frame) being greater than point 1 (steering rod leading end coupling to front forks) and point 7 (front fork pivot axis). The increased steering sensitivity combined with heavy steering damping has the effect of smooth and safe handling yet giving excellent manoeuvrability, especially at low speeds.

The differential in the distance between point 2 and point 5 compared with the distance between point 1 and point 7 also has beneficial damping effects on pedal torque feedback from the action of pedalling to the handlebars via the steering rod 3. This point, combined with the sensitivity of the steering and the vertical movement of the handlebars, allows the full weight of the rider's body to control the handlebar movement, which advantageously results in pedal torque feedback being almost entirely eliminated.

2. Frame Geometry

The seat, steering column (and thereby the front forks and front wheel) are attached to the second second sub-frame which itself is pivotally coupled via the first torsional pivot to the first sub-frame. The first sub-frame is supported on two rear wheels. The second subframe is able to pivot relative to the first sub-frame in order to lean steer the front wheel.

The handlebars are pivotally coupled to the first sub-frame through a second torsional pivot. More or less vertical movement of the handlebars (down on one side up on the other) causes the steering rod to act on the steering column to which the steering rod is attached. The steering rod is coupled to the handlebars at a trailing end of the steering rod and to the steering column at a leading end of the steering rod. A steering rod may be provided on either side of the handlebars to the steering column. Points A and B (FIG. 8a) are coupled with a rigid steering rod therefore point B moves in accordance with point A thus effecting steering of the front forks.

3. Handlebar Geometry

Figure 6A:
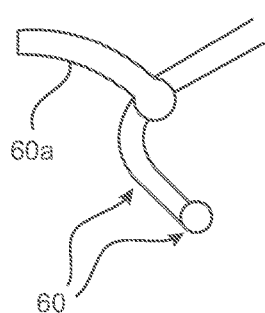
FIGS. 6a and 6b reveal diagrammatic side elevation and plan views of handlebar geometry of an embodiment of the present invention.
Figure 6B:
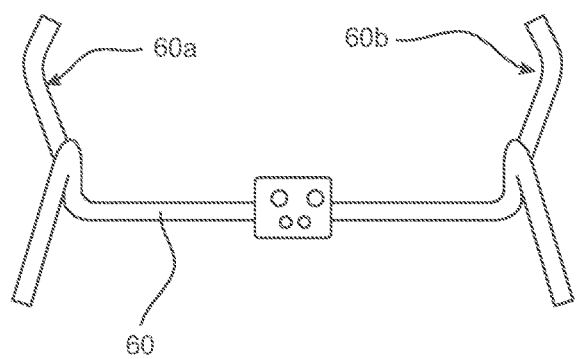

Referring to FIGS. 6a and 6b, the handlebar configuration allows for different hand positions on the handlebars. With the rider's hands forward using the handlebar end extensions 60a and 60b, the rider's arms and elbows are more or less locked straight giving tight control when pedalling in a straight line. When leaning to one side, as in when negotiating a tight turn or U turn at low speed, one hand is moved to the rear on the handlebars (the hand depending on the direction, left or right, of the turn). This allows the rider to have sufficient reach to push down on the handlebars to effect slow speed turning, as well as to lean over to some extent. Slow speed lean steering is essential both as an aid in reducing the turning circle from handlebar steering alone, but also to allow the front fork steering column to lean over with the knees otherwise the knees would end up contacting the front fork steering column. Handlebar geometry also has a bearing on high speed leaning through bends. In this situation one hand is forward on one of the bar end extensions 60a, 60b, and the other hand to the rear on the handlebar 60 itself. This gives a more stable feel to the rider through bends at speed. One hand forward and one hand back also allows the rider to more easily pick the cycle up whilst straddling the frame and turn the cycle around when stationary because the cycle is in balance.

4. Torsional Steering and Lean Mechanisms

There are two components to steering a cycle embodying the present invention, handlebar steering and lean steering. Which form of steering prevails during riding, or whether a combination of both forms of steering are used, depends largely on the speed of the cycle and tightness of a corner to be negotiated.

Figure 7A:
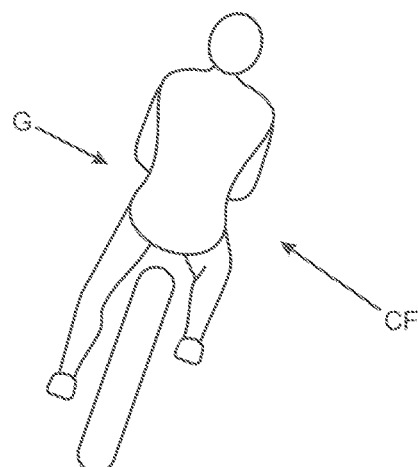
FIGS. 7a and 7b show diagrammatic examples of steering a cycle through a bend.
Figure 7B:
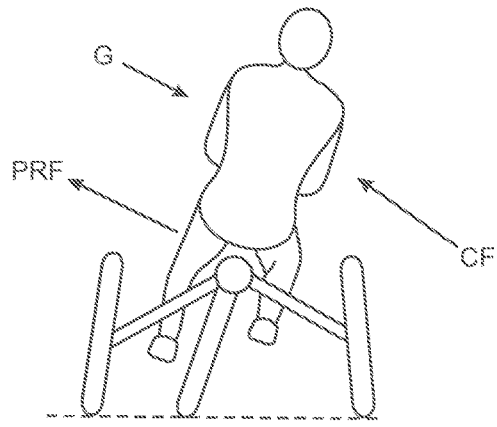

FIG. 7a shows lean of a traditional bicycle. In an arrangement shown in the embodiment in FIG. 7b, two torsional pivots are provided, that are more or less in line along the cycle frame. CF refers to centrifugal force, G refers to gravity and PRF refers to pivot reaction force. Referring to FIG. 7b, the cycle frame has a first sub-frame and a second sub-frame. The first sub-frame has mounted to it the rear wheels. The second sub-frame supports the rider's seat. The second sub-frame is being pivotally coupled to the first sub-frame through a first torsional pivot. The front forks are rotationally coupled to a pivot axis of second sub-frame. Shifting of a rider's centre of gravity to one side of the cycle causes a force to be applied to the first torsional pivot. This torsional pivot resists further leaning of the rider. The lean in the second sub-frame is transmitted to the front fork axis which is also caused to lean, which induces a turn in the front forks and hence in the front wheel towards the same side as the rider's lean. Thus lean steer is effected. The first torsional pivot can include increased resistance with increased lean and/or can include a physical limit of lean stop.

The second torsional pivot is inline with the forst torsional pivot along the frame, but is preferably provided lower down than the first torsional pivot. This second torsional pivot provides a substantially horizontal pivot axis for the handlebars, thereby the handlebars moving in a vertical direction. When traveling at higher speeds through bends the handlebar pivot provides reduced reaction force as the rider leans more but does not steer very much with the handlebars, most of the steering coming from lean steering at higher speeds. The rider is thus leaning over against centrifugal force, the centrifugal force having substituted for the reaction force of the handlebar pivot.

It has been found worthwhile reducing the reaction force of the rear torsional pivot (eg first torsional pivot) when leaning through bends at speed because the rider needs to find an equilibrium between centrifugal force (FIG. 7b) and gravity (G in FIG. 7b) with, ideally, no reaction force (PRF FIG. 7b) from the lean pivot (in this case the first torsional pivot). A way of reducing the effect of the lean pivot will hereinafter be described and forms a part of at least one embodiment of the present invention. Any reaction force from the lean pivot tends to cause the rider to slow down through bends in order to increase the 'pulling over' effect of gravity and to counter the combined centrifugal force and pivot reaction force which are tending to push the rider back upright.

Although a number of specific embodiments have been shown and described, individual features from one embodiment can be incorporated into another without changing the objective of the invention. However, the invention can be practiced in any form or configuration other than as illustrated and described herein, yet its spirit and scope remain integral and immutable in any such variant.

Figure 8A:
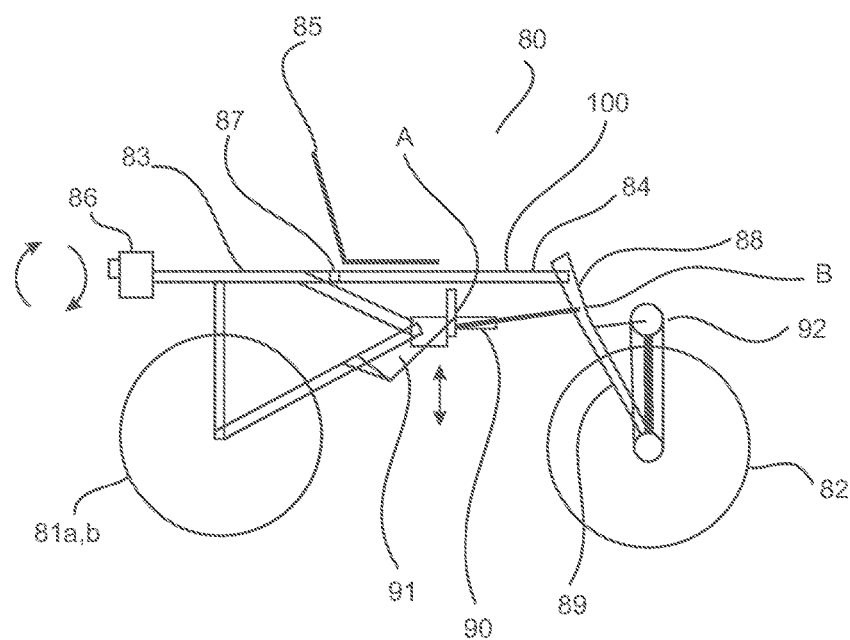
FIG. 8a shows a tricycle according to an embodiment of the present invention.

In FIG. 8a, the tricycle 80 includes a pair of rear wheels 81a, 81b (only one shown in side view) and a front wheel 82. The rear wheels are mounted to a first sub-frame 83 which itself is coupled to a second-sub-frame 84. The second sub-frame 84 supports a seat 85 for a rider and is arranged to pivot relative to the first sub-frame via a rear torsional pivot 86 and front bearing 87. It will be appreciated that the relative positions of the rear torsional pivot and front bearing may be moved to suit a particular application.

The first sub-frame is coupled to a steering column or head stock 88. Front forks 89 are mounted for rotational movement to the head stock.

Handlebars 90 are coupled to the first sub-frame via a second (horizontal) torsional pivot 91. A mechanical steering link connects the handlebars to the head stock.

Propulsion of the cycle shown is via pedalling of the front wheel via a chain driven gear set 92 positioned above the front wheel. Other gear arrangements are envisaged, such as hub gearing.

Alternatively, or in addition, the vehicle according to the present invention may be powered by electricity and/or an engine. This may assist or replace pedal power. Electric drive may be via batteries and/or solar power. Fuel cell technology may alternatively or in addition be applied, or any other motive power source.

In use, when a rider leans to one side of the vehicle, the seat tips with the rider and causes rotation of the main tube 100 of the second sub-frame. This causes the head stock to lean over and thereby a steering reaction is imparted to the front wheel via the front forks turning in the direction of lean. This is highly effective during lean steer at high speeds.

At slow speeds, steering can be effected by the rider vertically pushing/pulling on respective sides of the handlebars, causing the mechanical link to pull/push on the head stock and thereby also effect a steering action through the front forks.

A combination of these lean steer and mechanical steer actions may be employed, particularly at speeds where both are effective. It will be appreciated that the combination of ability to steer either through lean steer or through mechanical steer renders the vehicle more flexible and safer to use because it is controllable at any speed. For example, at slow speed where leaning to one side is difficult for a rider because there is no centrifugal force to counteract the lean and balance the rider, mechanical steer can be used. Likewise, at high speeds where pushing/pulling on the handlebars might be difficult when wanting to lean into he corner to prevent being thrown off the vehicle, lean steer itself will steer the vehicle. The vehicle of the present invention achieves the benefits of both forms of steering.

Also, the horizontal axis of the handlebar steering means that the handlebars rotate in a vertical direction and therefore do not obstruct the rider's legs or knees as with other known front to back handlebar steering.

The lean mechanism can include one or more friction clutches or slip clutches to assist in controlling lean. Such a clutch can be adjustable to fine tune the clutch to suit a particular ride characteristics of the vehicle or a rider's preferred ride style. For example, a particular rate of lean/tilt can be selected and/or lean/tilt resistance can be predetermined. The clutch(es) can exhibit 'springbuck' characteristics to assist in returning the vehicle to an upright orientation.

Ratios in the above can be adjusted for all different rider weights and styles.

Torsion pivots can be adjustable, such as in stiffness and/or the material for different rider weights and styles. An additional damper may be included for additional damping to the lean mechanism, which also provides additional safety to prevent over leaning and the rider falling sideways.

FIGS. 9a to 9e show an alternative embodiment of the present invention.

The tricycle 200 has a first sub-frame 202 rotatably coupled with respect to a second sub-frame 204. The relative rotation is damped and restricted by a torsion bush arrangement 206 at the rear.

A seat 208 is mounted to the central tube 210 of the second sub-frame. Thus the seat can rotate relative to the first sub-frame.

Handlebars 212 are mounted to a torsion bush 214 arrangement mounted to the first sub-frame.

A steering arm 216 connects the handlebars to the front forks 218 and steering head 220. The steering head and front forks can be rotated by the handlebars operating the steering arm. This mode of steering is particularly beneficial at low speed.

The front forks and steering head can also be rotated about the steering head axis 222 by relative rotation of the second sub-frame and the steering head. This mode of steering is particularly efficacious at higher speeds.

Both modes of steering can be transitioned one to the other dependent on speed and rate of change of direction and/or severity of change of direction.

Speed change via a chain driven gear set is effected through the gear set 224 mounted above the front wheel. Chain drive 226 connected from the front mounted pedal crank 228 is transferred through the gear set to a gear driven chain drive 230 that acts on the front wheel.

The steering arm connects to the front forks or steering head immediately ahead of the steering head pivot axis.

Figure 9A:
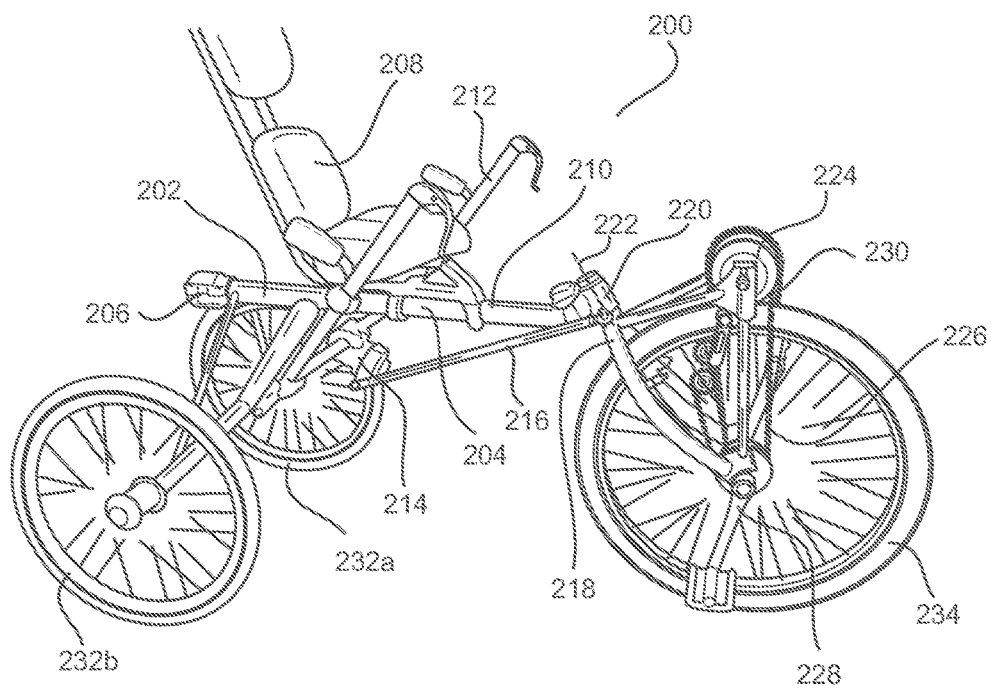
FIGS. 9a to 9e show features of a tricycle according to an embodiment of the present invention.
Figure 9B:
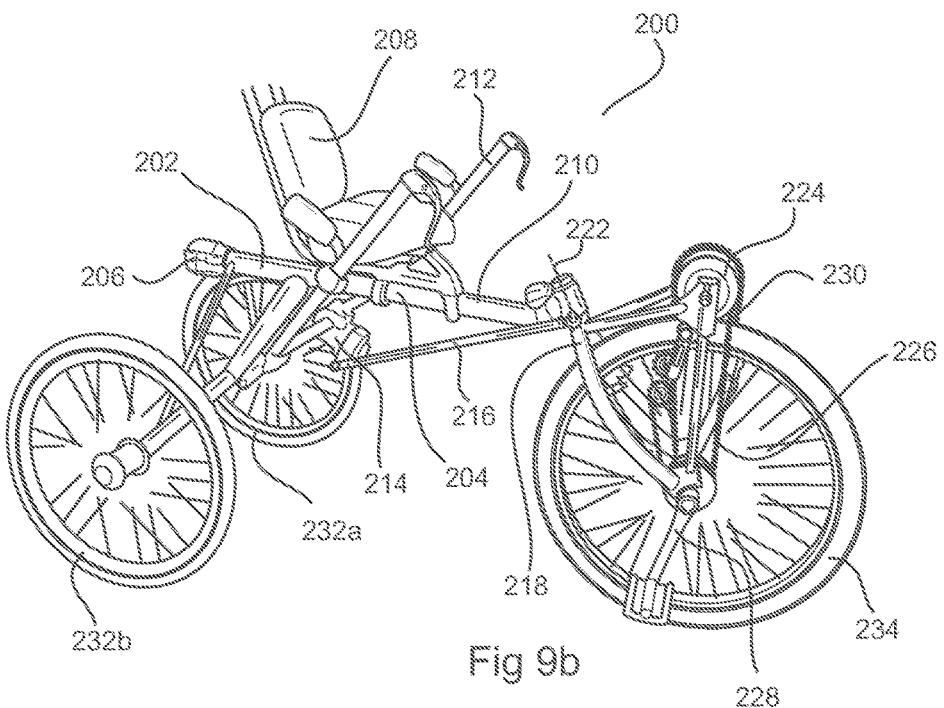

In particular, FIGS. 9a and 9b show side views of a tricycle according to an embodiment of the present invention.

Figure 9C:
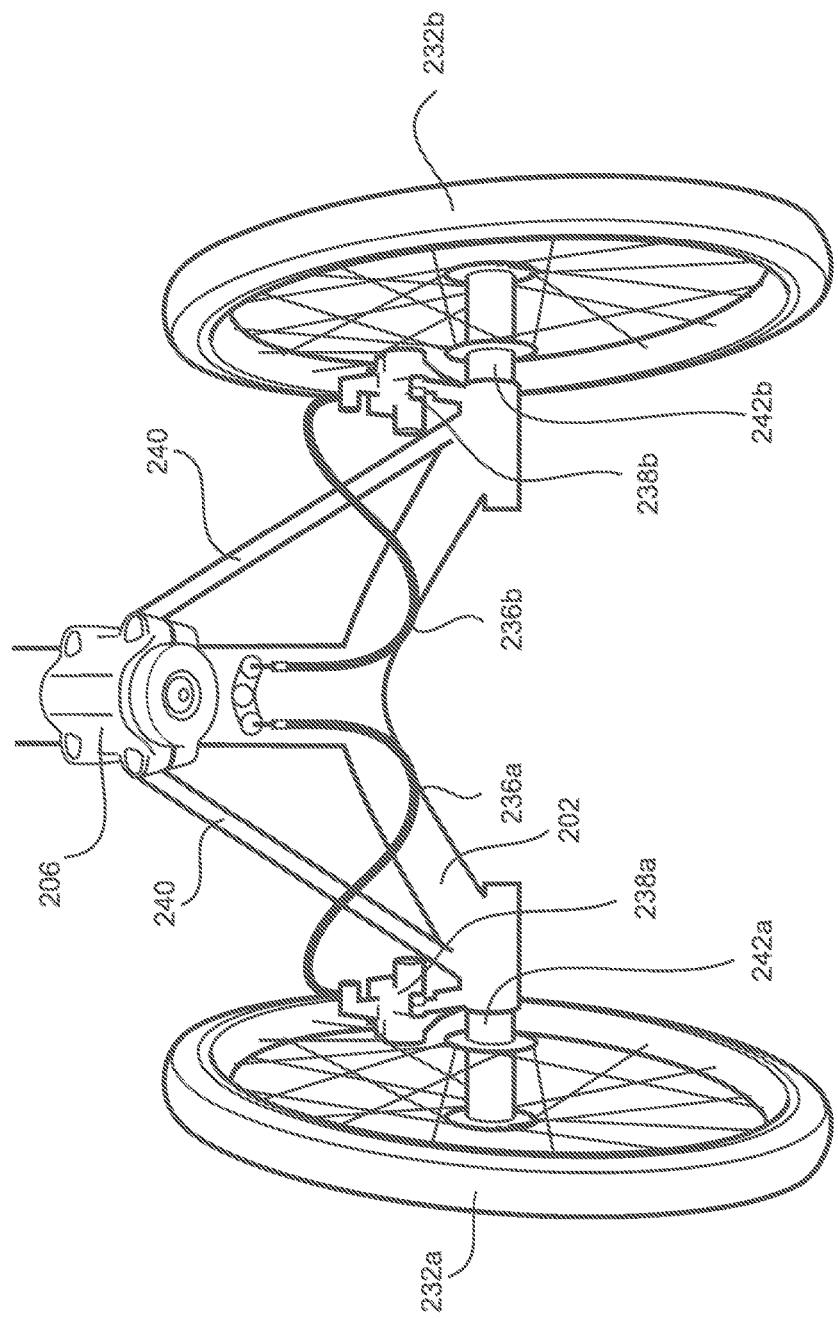

FIG. 9c shows a rear view of the tricycle of FIGS. 9a and 9b. This view shows the rear torsion bush 206 arrangement that provides the damped and restricted rotatable coupling between the first and second sub-frames. The first sub-frame 202 supports the rear wheels 232a, 232b in this embodiment. Brake lines 236a,236b to respective brake callipers 238a, 238b are shown emerging through the hollow tube of the first sub-frame.

Support struts 240 stabilise and rigidise the first sub-frame. The wheels can be quick release wheels from respective stub axle assemblies 242a,242b.

Figure 9D:
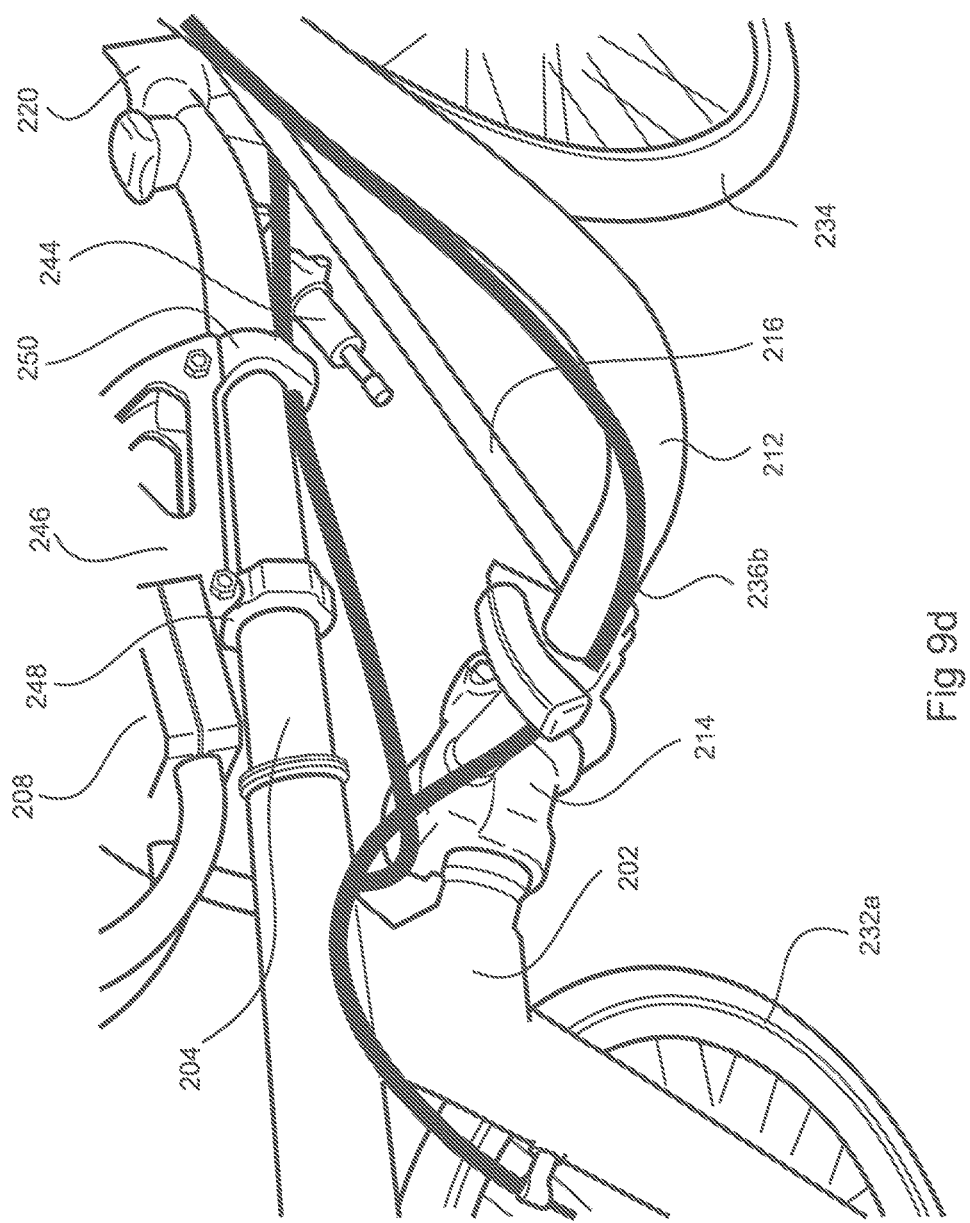

FIG. 9d shows the handlebars 212 coupled under the seat 208 to the first sub-frame 202 via a torsion coupling 214. The seat is mounted to the second sub-frame via a seat mounting bracket 246 with clamps 248,250 around the tube of the second sub-frame.

Connection of the steering arm (steering member) 216 to the handlebars 212 is clearly shown. Also, the steering damper 244 is shown connected to the second sub-frame 204 and a distal end of the damper connects to the front forks or steering head to damp steering, which prevents sudden jerks through the steering, such as from travelling over rough ground or sudden potholes.

Also, the second sub-frame central tube can be seen coaxial with and extending into the lumen of the corresponding central tube of the first sub-frame, thus provision the relative rotation via the torsion bush coupling at the rear.

Figure 9E:
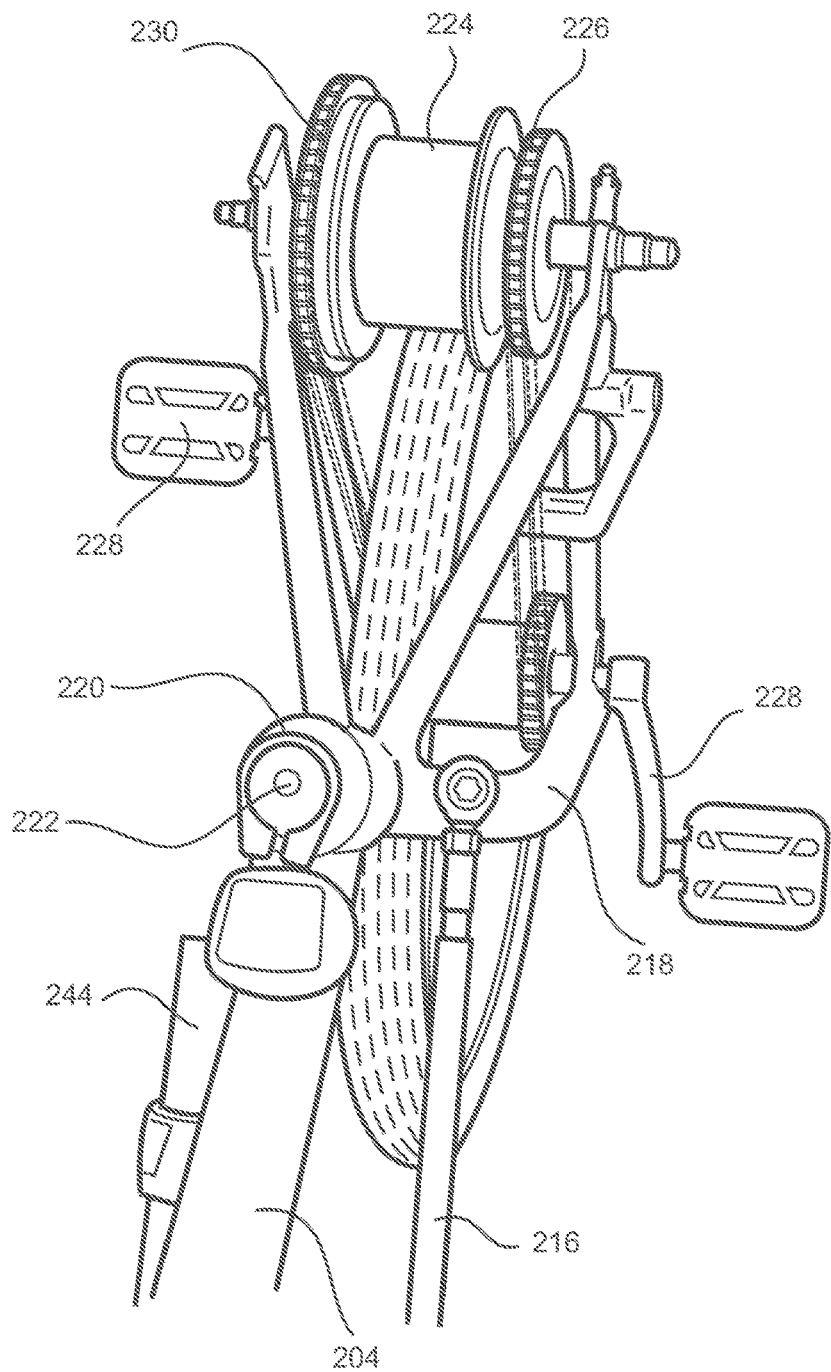

FIG. 9e shows a downward view of the front forks 218 coupled to the second sub-frame 204 central tube via the steering head 220. The steering arm (steering member) 216 can be seen coupled to the top of one of the front forks immediately forward of the pivot axis 222 of the steering head 220. The steering member is coupled via a rotatable knuckle joint or ball joint. The chain driven gear set or gear hub is shown over the top of the crank set.

The first sub-frame 202 and second sub-frame 204 can be separated for transport. The rear wheels can be removed and the front wheel disconnected from the front forks. Also, the seat can be removed. This disassembly advantageously enhances transport of the vehicle and increases the number of vehicles that can be transported in a single shipping container.

The claims defining the invention are as follows:
1. A vehicle having:
    a first sub-frame and a pair of rear wheels coupled to said first sub-frame;
    a second sub-frame pivotally coupled to said first sub-frame whereby said second sub-frame is arranged to pivot about a first pivot axis relative to said first sub-frame;
    a seat supported by said second sub-frame, the seat arranged to seat a rider of said vehicle;
    at least one steerable front wheel coupled to said second sub-frame via a pivotable steering head; and
    handlebars operatively coupled to said steering head via at least one steering member;
    whereby said vehicle is steered by manipulating said handlebars to act on said steering member which rotates the steering head and also the at least one front wheel to steer the at least one front wheel and by the seat leaning off centre relative to a central axis of the first sub-frame and/or second sub-frame causing the second sub-frame and also the seat to rotate relative to the first sub-frame such that the second sub-frame and steering head rotate relative to one another.

2. The vehicle according to claim 1, wherein one or both of the handlebars and second sub-frame is connected to the steering head via at least one damper.

3. The vehicle according to claim 1, wherein a pivot axis of the steering head is between 45 degrees and 180 degrees relative to the second sub-frame or vertical.

4. The vehicle according to claim 1, wherein a centre of gravity of the vehicle remains within a triangle footprint of the two rear wheels and the at least front wheel when steering.

5. The vehicle according to claim 1, wherein the first sub-frame and second sub-frame are pivotably coupled to one another via at least one bush allowing restricted relative rotation between the first and second sub-frames.

6. The vehicle according to claim 5, wherein the at least one bush includes one or more elastomeric bush members.

7. A vehicle according to claim 6, wherein a pivot for the handlebars is below the seat and lower than a pivot of the first pivot axis between the first and second sub-frames.

8. The vehicle according to claim 1, wherein the at least one steering member is coupled to the steering head or to front forks forward of a pivot axis of the steering head.

9. A vehicle according to claim 1 wherein the vehicle is configured to steer primarily by lean steering at high speeds and primarily by handlebar steering at low speeds.

10. A vehicle according to claim 1 wherein the vehicle is a cycle comprising a tricycle or bicycle or other multi wheeled pedal powered vehicle.

11. A vehicle according to claim 1, wherein the handlebars are pivotably coupled to the first sub-frame via a second pivot.

12. The vehicle according to claim 1, wherein the handlebars are directly or indirectly coupled to said second sub-frame by a mechanical link.

13. A vehicle according to claim 1, wherein a relative distance between a connection point of a steering link or member of the vehicle to an axis of a steering column or head of the vehicle compared to a distance between a connection point between the steering link or member to a pivot axis of the handlebars and/or a distance of the pivot axis of the handlebars below the connection point of the steering link or member to the steering column determines a mechanical steering effect of the vehicle.

14. A vehicle according to claim 1 including a steering damper device.

15. A vehicle having:
a first sub-frame and a pair of rear wheels coupled to said first sub-frame;
a second sub-frame pivotally coupled to said first sub-frame whereby said second sub-frame is arranged to pivot about a first pivot axis relative to said first sub-frame;
a seat supported on said second sub-frame for seating a rider of said vehicle;
a steerable front wheel rotatably coupled to said second sub-frame; and
handlebars for steering said front wheel via a coupled steering arm;
whereby said vehicle is steered by one or both of pivoting of said second sub-frame relative to said first sub-frame by the seat leaning off centre relative to a central axis of the first sub-frame and/or second sub-frame causing the second sub-frame and also the seat to rotate relative to the first sub-frame such that the second sub-frame and steering head rotate relative to each other and manipulation of said handlebars.

16. A vehicle according to claim 15 wherein the vehicle is configured to steer primarily by lean steering at high speeds and primarily by handlebar steering at low speeds.

17. A vehicle according to claim 15 wherein the vehicle is a cycle comprising a tricycle or bicycle or other multi wheeled pedal powered vehicle.

18. A vehicle including:
a first sub-frame connected to at least one wheel of the vehicle;
a second sub-frame supporting a seat for supporting a rider of the vehicle, the second sub-frame arranged to pivot about a pivot axis relative to said first sub-frame;
at least one further wheel coupled to said second sub-frame; and
handlebars pivotally coupled to said first sub-frame for movement about a pivot axis and connected to said at least one further wheel by a mechanical steering link;
whereby said vehicle is lean steered by applying a force to pivot said second sub-frame to a side of the vehicle relative to said first sub-frame to effect lean steering of said at least one further wheel and/or is mechanically steered by upward movement of a first end portion of said handlebars relative to said pivot axis to effect a mechanical steering of said at least one further wheel via said mechanical steering link.

19. A vehicle according to claim 18 wherein the vehicle is configured to steer primarily by lean steering at high speeds and primarily by handlebar steering at low speeds.

20. A vehicle according to claim 18 wherein a frame design/geometry, pivot resistance, handlebar and mechanical link design and/or steering geometry determine transition characteristics between lean steering and handlebar steering modes as speed of the vehicle varies.

21. A vehicle according to claim 18, wherein a proportion of lean steering to handlebar steering transitions between lean steering and handlebar steering modes for intermediate speeds of the vehicle.

22. A vehicle according to claim 18 wherein the vehicle is a cycle comprising a tricycle or bicycle or other multi wheeled pedal powered vehicle.

* * * * *